United States Patent
Kinoshita et al.

(10) Patent No.: US 6,250,108 B1
(45) Date of Patent: Jun. 26, 2001

(54) GLASS-MAKING METHOD

(75) Inventors: Hiroaki Kinoshita, Hino; Morinao Fukuoka, Sagamihara, both of (JP)

(73) Assignee: Olympus Optical Co., LTD, Tokyo (JP)

( * ) Notice: Subject to any disclaimer, the term of this patent is extended or adjusted under 35 U.S.C. 154(b) by 0 days.

(21) Appl. No.: 09/108,382

(22) Filed: Jul. 1, 1998

(30) Foreign Application Priority Data

Jul. 2, 1997 (JP) .................................................. 9-177162

(51) Int. Cl.[7] ................................ C03B 8/00; C03B 8/02
(52) U.S. Cl. ............................ 65/17.2; 65/901; 501/73; 501/64; 501/12
(58) Field of Search .................................. 501/55, 64, 66, 501/152, 12, 73; 65/17.2, 33.7, 901

(56) References Cited

U.S. PATENT DOCUMENTS

| | | | |
|---|---|---|---|
| 3,640,093 | * | 2/1972 | Levene et al. ........................ 65/134.1 |
| 5,123,940 | * | 6/1992 | DiGiovanni et al. ................... 65/901 |
| 5,268,101 | * | 12/1993 | Anderson ............................... 501/12 |
| 5,439,495 | * | 8/1995 | Koike et al. ........................... 65/17.2 |
| 5,622,551 | * | 4/1997 | Erbe et al. ............................. 106/35 |

FOREIGN PATENT DOCUMENTS

| | | |
|---|---|---|
| 5-27575 | 4/1993 | (JP) . |
| 6-171956 | 6/1994 | (JP) . |
| 6-171974 | 6/1994 | (JP) . |

* cited by examiner

*Primary Examiner*—James Derrington
(74) *Attorney, Agent, or Firm*—Pillsbury Winthrop LLP

(57) ABSTRACT

In a method of making a high-quality silica glass, a rare earth element that is a substance making a great contribution to the index of refraction is introduced therein together with aluminum for stabilizing the glass. An alkoxide of aluminum or its derivative is used as the starting material for preparing a boehmite sol. A salt of at least one element selected from rare earth elements or a solution in which the salt is dissolved and the boehmite sol are mixed with a silica sol, whereupon the sols are vitrified.

7 Claims, No Drawings

GLASS-MAKING METHOD

BACKGROUND OF THE INVENTION

The present invention relates to a method of making a glass such as a high-refractive-index and low-dispersion glass or an index gradient glass applicable to optical elements for cameras, microscopes, endoscopes, electronic image devices, and micromachine eyes.

Rare earth element-containing glasses possess advantages of having high refractive indices and low dispersion, and being lower in toxicity than lead or the like, and so are now used as the greatly valuable glasses required for high-performance optical systems. In particular, Y, La, and Gd-containing glasses are transparent to light in the visible light region, and so are greatly valuable glasses that are used for lenses, etc. employed with white light. In the present disclosure, the term "rare earth element" is understood to refer to scandium or Sc, yttrium or Y, and 15 lanthanum series, viz., lanthanum or La, cerium or Ce, praseodymium or Pr, neodymium or Nd, promethium or Pm, samarium or Sm, europium or Eu, gadolinium or Gd, terbium or Tb, dysprosium or Dy, holmium or Ho, erbium or Er, thulium or Tm, ytterbium or Yb, and lutetium or Lu.

An index gradient type optical element comprises a medium to which a refractive index gradient and, hence, power (refractive power) is imparted, and is now attracted as an optical element indispensable for the next generation of optical system because its ability to make correction for aberrations is so excellent that the number of lenses forming the system can be reduced.

In general, the greater index difference a glass imparts to a lens medium, the more useful the glass is for an index gradient type optical element. Regarding the ability to make correction for aberrations, for instance, *SPIE*, Vol. 1780, pp. 456–463 (1992) reports that an index gradient type optical element having a low or negative dispersion profile is excellent in terms of the ability to make correction for aberrations, and so is useful for a white light optical system.

Such an index gradient type optical element is made by several glass-making methods, e.g., sol-gel, ion exchange, and molecular stuffing methods. In particular, the sol-gel method has features that make it possible to obtain glass materials with a large aperture, and enable a profile to be imparted to a polyvalent metal oxide so that the resulting index gradient type optical element can have varying properties, and so captures attention.

JP(A)6171974 discloses a method of using La, Y, and Gd components to make an index gradient type glass having a large index difference or a low or negative dispersion profile, wherein, to obtain a silica glass containing much rare earth element, an Al or other component is added hereto.

A typical method of making a glass material having an index gradient by the sol-gel process is disclosed in JP(B) 93027575, which comprises steps of hydrolyzing a solution composed mainly of an alkoxide of silicon to obtain a sol, adding to the sol a solution containing a water-soluble metal salt for imparting an index gradient thereto, thereby obtaining a wet gel, dipping the wet gel in a solution in which the metal salt has a low solubility, thereby precipitating a metal salt crystallite in the wet gel, dipping the wet gel in a solution in which the metal salt has a high solubility, thereby imparting a metal component gradient thereto in a diametrical direction, and drying and firing the wet gel, thereby obtaining a glass material having an end index gradient. JP(A)6171956 discloses glass production by imparting a concentration gradient to a staring element such as La, Y, and Gd using an inorganic or organic salt, and using a metal alkoxide or its derivative as a raw material for Nb, Ta, Ti, and Zr.

A silica glass containing much rare earth element component is stably vitrified by the addition of a component such as Al thereto. This appears to be because that silica and the rare earth element are stabilized, thereby making their coagulation so unlikely to occur that their crystallization can be well prevented.

Raw materials for rare earth element components, for instance, include metal salts, and alkoxides of rare earth elements. The metal alkoxides of rare earth element components, because of having a very low solubility in organic solvents, require much organic solvent and/or acid for their dissolution. In contrast, the metal salts of rare earth element components have a relatively high solubility in solvents, especially water. Consequently, they can yield a solution having a higher rare earth element concentration as compared with the metal alkoxides, and so are suitable for making a sol containing much rare earth element component. Even when the metal salt, e.g., acetate of a rare earth element component is used, however, relatively much water is needed for its dissolution because its solubility in water or an organic solvent is not very high.

On the other hand, raw materials for aluminum include alkoxides represented by $Al(OR)_3$ where R stands for an alkyl group or their derivative, and metal salts represented as by $Al(NO_3)_3 \cdot 9H_2O$.

When an alkoxide of aluminum or its derivative is used for the raw material, gel skeletons can be easily made at room temperature upon mixing with a silicon alkoxide, because the aluminum alkoxide has an Al—O bond in its molecular structure from the first time. In the case of a metal salt of aluminum, on the other hand, aluminum cannot form gel skeletons with silica alone because aluminum is present in the form of aluminum ions formed by dissociation. In other words, when the metal salt of aluminum is used for the aluminum material, the resulting gel is relatively fragile and so susceptible to cracking because the number of gel skeletons is smaller than that obtained by the use of the metal alkoxide. In view of the formation of a difficult-to-crack gel, it is thus preferable to use a metal alkoxide of aluminum or its derivative. When the sol-gel process is applied to glass-making, however, a large amount of alcohol or other organic solvent is needed for dispersing the silicon alkoxide, aluminum alkoxide, etc. by a conventional process to obtain a homogeneous sol, because the aluminum alkoxide has a very limited solubility in ethanol, isopropanol, etc.

For the raw material for the rare earth element component it is preferable to use a solution obtained by dissolving its metal salt in water, and for the raw material for aluminum it is desired to use its metal alkoxide or a derivative thereof. In most cases, the metal salt of the rare earth element needs much water because of its low solubility while the metal alkoxide of aluminum or its derivative needs much organic solvent because of their low solubility. Consequently, the concentration of the gel skeleton component contained in the sol becomes very low. In a thermal treatment process in which a wet gel obtained by gelation of such a sol is thermally treated into glass, the gel contracts very largely, and cracks due to an increased stress upon contraction. This in turn makes it impossible to obtain glass or glass yields extremely worse.

For the introduction of much metal salt of the rare earth element, much water is required. Under conditions where much water is present, however, it is difficult to hydrolyze the alkoxide of aluminum or its derivative in a stable manner because their rate of hydrolysis is very high. The solubility of the metal salt of the rare earth element may be increased by elevating the temperature of water or an organic solvent. However, this causes the hydrolysis of the alkoxide of aluminum to be locally promoted, resulting in precipitation and segregation, and it is consequently impossible to make a homogeneous sol and, hence, glass.

For the production of an index gradient glass using precipitation, it is always required to use the metal salt of the rare earth element. In this case, such problems as mentioned above become unavoidably serious.

An object of the present invention is to provide a method of making a glass of excellent quality in a stable manner without causing gel cracking, in which aluminum indispensable for the stabilization of a rare earth element and silica glass is introduced into the silica glass so as to enable the rare earth element that is a substance contributing greatly to the refraction of index of glass to be introduced in a large amount.

SUMMARY OF THE INVENTION

According to a first aspect of the present invention, there is provided a method of making a silica glass comprising aluminum, and at least one element selected from a group consisting of rare earth elements, wherein a boehmite sol is used as a raw material for aluminum.

According to a second aspect of the invention, there is provided a method of making a silica glass comprising aluminum, and at least one element selected from a group consisting of rare earth elements, which involves steps of preparing a boehmite sol by using an alkoxide of aluminum or a derivative thereof as a raw material, and mixing said boehmite sol with a salt of at least one selected from the group consisting of rare earth elements or a solution in which said salt is dissolved.

According to a third aspect of the present invention, there is provided a method of making a silica glass comprising aluminum, and at least one element selected from a group consisting of rare earth elements, which involves a step of preparing a boehmite sol from a solution obtained by mixing an aqueous solution in which a salt of at least one element selected from the group consisting of rare earth elements is dissolved with an alkoxide of aluminum or a derivative thereof.

According to the present invention, there is provided any one of said glass-making methods, which further comprises a step of imparting to at least one element selected from the group consisting of rare earth elements a concentration gradient having an increasing concentration of said metal component from a periphery to a center of said at least one element.

According to the present invention, there is provided any one of said glass-making methods, with said at least one element selected from the group consisting of rare earth elements having a concentration gradient increasing from a periphery to a center thereof, which further comprises a step of imparting to said at least one metal element selected from a group consisting of Ti, Nb, Ta, and Zr a concentration gradient that is uniform across said at least one metal element or decreases from a periphery or a center of said at east one metal element.

According to the present invention, there is provided any one of said glass-making methods, wherein said rare earth element is selected from a group consisting of lanthanum, gadolinium, and yttrium.

DESCRIPTION OF THE PREFERRED EMBODIMENT

The present invention provides a method of making a silica glass that contains much rare earth element, and an aluminum component so as to achieve stable vitrification, wherein, to homogenize said aluminum component susceptible to becoming inhomogeneous, a boehmite sol is used as a raw material for aluminum. The boehmite sol used herein is a sol containing an easily deflocculating particulate form of substance that is obtained by heating amorphous aluminum monohydroxide obtained by hydrolysis of an aluminum compound immediately upon said hydrolysis, and is represented by the following molecular formula:

AlO(OH)

Having already an Al—O bond at room temperature, the boehmite sol tends to form a gel skeleton easily and has an effect on prevention of the crystallization of the rare earth element when mixed with a silicon alkoxide, and has an effect on prevention of cracking when used for glass-making.

The alkoxide of aluminum or its derivative susceptible to inhomogeneous precipitation is hydrolyzed by the addition of much water thereto to prepare inhomogeneous aluminum hydroxide, which is then deflocculated by an acid into a homogeneous boehmite sol; permissible reaction conditions such as the amount of water added, stirring variations, and fluctuations in the reaction temperature are selected from so wide a range that a rare earth element-containing silica glass can be obtained with stable quality. That is, the aluminum can be formed into a boehmite sol which enables aluminum to be introduced in the silica glass in a stable manner. Thus, the present invention has the advantage of dispensing with difficult-to-control reactions such as a partial hydrolysis of silica, and aluminum components, and the formation of a silicon-aluminum composite alkoxide.

The boehmite sol is prepared by adding to an alkoxide of aluminum represented by $Al(OR)_3$ where R is an alkyl group or a derivative represented by $(RO)_{3-n}AlL_n$ where R is an alkyl group, n=1 to 2, and L is a ligand such as an acetyl-acetonato group, and an ethoxyacetylacetonato group an aqueous solution composed mainly of relatively hot water that is at a temperature higher than 10° C. and below 100° C., and preferably 50° C. to 90° C., and stirring the aqueous solution while the solution is heated in an oil bath at a temperature that is higher than 30° C. and below 200° C., and preferably 50° C. to 100° C., so that the hydrolysis of the alkoxide of aluminum or its derivative is promoted to form aluminum hydroxide. At this time, it is effective to make use of reflux heating and it is preferable to use water in an amount of 20 to 200 moles, and preferably 30 to 100 moles with respect to the alkoxide of aluminum. Then, a suitable concentration of an acid is added to the obtained aluminum oxide. For instance, nitric acid is used at a molar ratio of 0.1 with respect to aluminum. The resulting solution is stirred in an oil bath at a temperature that is higher than 10° C. and below 200° C., and preferably 50° C. to 100° C. for at least one hour, and preferably 10 hours to 100 hours. At this time, it is again effective to make use of reflux heating. Consequently, the aluminum hydroxide is deflocculated into homogeneous fine particles, yielding a sol containing boehmite having a low viscosity. To allow the present method to be effective, the concentration of boehmite contained in the sol is at least $1\times10^{-6}$ mol/l, and preferably at least $1\times10^{-4}$ mol/l. The boehmite sol can then mix and react with the silicon alkoxide-containing solution, yielding a sol having many gel skeletons. By adding the rare earth element at the sol preparation step it is possible to prepare a gel with the boehmite sol and the rare earth element-containing sol incorporated therein, and by thermally treating the gel it is possible to obtain a rare earth element-containing silica glass with no crystallization of the rare earth element added.

A possible explanation of prevention of crystallization of the rare earth element could be that the flocculation of the rare earth element during the thermal treatment is inhibited due to interaction among the aluminum, oxygen, and rare earth element contained in the boehmite.

With the method of the present invention, it is possible to increase the concentration of the rare earth element in the glass, because a larger amount of metal component can be introduced in the glass with a smaller amount of solvent by mixing the boehmite sol with the metal salt of the rare earth element that has a relatively higher solubility than an organic metal salt of the rare earth element or an aqueous solution in which this metal salt is dissolved. For the addition of the rare earth element, the boehmite sol may be mixed with either the solution in which the salt of the rare earth element is dissolved or the salt of the rare earth element in a solid state. For the method of the present invention, it is preferable to make a selection from the processes wherein the solvent or water can be used in a smaller amount.

At the same time, it is possible to make much higher the concentration of the gel skeleton component contained in the sol, thereby ensuring prevention of cracking.

When the method of the present invention is used with the salt of the rare earth element, it has an additional advantage of being suitable for index gradient glass production involving a precipitation step.

An index gradient glass having a large index difference with a concentration gradient imparted to a rare earth element is preferably produced by precipitation in view of the solubility of the rare earth element. However, a relatively easily available salt of the rare earth element, too, is not sufficient in terms of solubility; that is, the concentration of the rare earth element in a sol decreases unavoidably. A gel with the rare earth element introduced in the sol is susceptible to cracking due to a decrease in the amount of glass skeleton-forming silica. It is thus difficult to obtain a glass having a large index gradient, with a gradient imparted to the rare earth element.

The method of the present invention, wherein the concentration of the rare earth element in the gel is kept high, has an effect that a large concentration gradient can be easily imparted across the rare earth element to thereby foreclose the possibility of cracking due to an increase in the concentration of the glass skeleton component in the sol. Thus, the method of the present invention is best suited for the production of an index gradient glass having a large index difference, with a concentration gradient imparted across the rare earth element.

With the method of the present invention, a larger amount of the rare earth element component can be incorporated in the glass, thereby ensuring prevention of cracking. This can be achieved by using an aqueous solution in which the metal salt of the rare earth element has been dissolved as relatively hot water for the hydrolysis of the alkoxide of aluminum or its derivative, thereby preparing the boehmite sol. Relatively hot water is required for the preparation of the bohemia sol by the hydrolysis of the alkoxide of aluminum or its derivative. However, a larger amount of the metal salt of the rare earth element can be dissolved in water of higher temperature; that is, a larger amount of the rare earth element can be introduced in a smaller amount of the solvent with the result that the concentration of the rare earth element in the sol can be increased with an increase in the concentration of the gel skeleton component. It is thus possible to produce a glass containing much rare earth element in a stable manner yet under conditions where the glass is unlikely to crack.

According to the method of the present invention, it is also possible to produce an index gradient glass having a large index difference corresponding to the concentration gradient of the rare earth element in a stable manner yet under conditions where the glass is unlikely to crack. To this end, the sol obtained by a reaction of the boehmite sol containing the salt of the rare earth element with the silicon alkoxide is first poured into a molding vessel for gelation. The obtained gel is dipped in a solution in which the salt of the rare earth element has a low solubility, thereby precipitating a crystallite form of the salt of the rare earth element in the wet gel, followed by the fixation of the crystallite. Then, the gel is dipped in a solution in which the salt of the rare earth element has a relatively high solubility to thereby dissolve the salt so that a convex form of concentration gradient of the metal component can be imparted across the gel, followed by the fixation, drying, and firing of the gel. It is thus possible to produce an index gradient glass having a large index difference corresponding to the concentration gradient of the rare earth element in a stable manner yet under conditions where the glass is unlikely to crack.

Depending on an appropriate combination of the concentration gradient of the rare earth element with the concentration gradient of at least one metal component selected from the group of Ti, Nb, Ta, and Zr, it is also possible to produce an index gradient glass, and especially an index gradient glass having a low or negative dispersion profile in a stable manner yet under conditions where the glass is unlikely to crack. Simultaneously with or separately from this, at least one metal component selected from the group consisting of Ti, Nb, Ta, and Zr is provided with a concentration gradient that is uniform across the component or decreases from the periphery to the center of the component. While such a concentration gradient is fixed, the aforesaid mixture is dried, and fired, so that an index gradient glass having a low or negative dispersion profile depending on an appropriate combination of the concentration gradient of the rare earth element with the concentration gradient of Ti, Nb, Ta, and Zr can be produced in a stable manner yet under conditions where the glass is unlikely to crack.

EXAMPLE

The present invention will now be explained with reference to some examples.

Example 1

An 80° C. aqueous solution of lanthanum acetate.1.5 $H_2O$ (92.63 grams) dissolved in water (578.63 grams) was added to aluminum isopropoxide (55.15 grams), and stirred at 80° C. for 1 hour for the hydrolysis of aluminum isopropoxide. Then, 1N nitric acid (27.03 grams) was added to the solution, which was in turn stirred at 80° C. for 76 hours for deflocculation, thereby preparing a lanthanum-containing boehmite sol. Next, ethanol (38.70 grams) was added to silicon tetramethoxide (31.95 grams), followed by the addition of 1N hydrochloric acid (15.12 grams). The solution was then stirred for 1 hour for hydrolysis, whereupon the aforesaid La-containing boehmite sol was added to the solution for a 1-hour stirring, thereby obtaining a homogeneous sol. This sol was cast into 100 polypropylene vessels to prepare wet gels, which were dried at 100° C., and heated to 990° C. for firing, thereby obtaining crackless, high index glasses in yields of 80% or higher.

Example 2

A wet gel obtained as in Example 1 was dipped in a mixed solution consisting of lanthanum acetate-containing isopropanol and water and, then, in a mixed solution consisting of methanol and ethanol for the precipitation of a crystallite form of lanthanum oxide in the gel. Following this, the lanthanum oxide crystallite was dipped in potassium acetate-containing methanol to impart a convex form of lanthanum gradient thereto. The wet gel was heated to 150° C. for drying and, then, to 975° C. for firing, thereby preparing an index gradient glass having a high dispersion profile with Δn=0.12.

Example 3

A wet gel obtained as in Example 1 was dipped in a mixed solution consisting of lanthanum-containing isopropanol and water and, then, in a mixed solution containing methanol and ethanol to precipitate a crystallite form of lanthanum oxide in the gel. Following this, the wet gel was dipped in methanol containing potassium acetate and titanium tetrabutoxide to impart a convex gradient to lanthanum and a concave gradient to titanium. This wet gel was heated to 150° C. for drying, and then to 975° C. for firing, thereby preparing an index gradient glass having a low dispersion profile with Δn=0.08.

Example 4

A solution of aluminum isopropoxide (86 grams) added to water (800 ml) was stirred at 80° C. for 1 hour in an oil bath, and 1N nitric acid (42 ml) was added to the solution, which was in turn stirred at 80° C. for 24 hours for deflocculation, thereby obtaining a homogeneous sol containing about 0.5 moles of boehmite. Powdery yttrium acetate·4 $H_2O$ (162 grams) was added to and dissolved in the boehmite sol under agitation to obtain a homogeneous boehmite sol containing yttrium. A mixed solution consisting of silicon methoxide (56 grams) and ethanol (100 grams) was added to and stirred with the obtained Y-containing boehmite sol at room temperature for 3 hours, thereby obtaining a homogeneous sol.

Next, the sol was poured in a vessel where it was allowed to stand alone for gelation, thereby obtaining a wet gel. This wet gel was dipped in a mixed solution consisting of methanol and ethanol to precipitate an yttrium acetate salt in the gel.

The wet gel was heated to 90° C. for drying and, then, to 1,100° C. for thermal treatment so that a homogeneous, high index glass could obtained.

Example 5

The wet gel with yttrium acetate precipitated therein, obtained in Example 4, was dipped in methanol containing potassium acetate and zirconium tetrabutoxide to impart a convex gradient to lanthanum and a concave gradient to zirconium. The wet gel was heated to 150° C. for drying and, then, to 975° C. for firing, thereby preparing an index gradient glass having a negative dispersion with Δn=0.07.

As explained above, the method of the present invention can provide a silica glass having stabilized properties and containing a large amount of a rare earth element capable of imparting a high index property thereto.

What we claim:

1. A method of making a silica glass comprising aluminum, and at least one metal element selected from a group consisting of gadolinium, lanthanum and yttrium, wherein:

a boehmite sol containing said aluminum and said at least one metal element is prepared by adding a salt of said at least one metal element to a boehmite sol formed of an alkoxide of aluminum or a derivative thereof or by hydrolysis of a mixture of an alkoxide of aluminltum with a salt of said at least one metal element, the sol is mixed with a solution containing silicon alkoxide, and an obtained sol is gelled by aging, followed by drying and thermal treatment of a gel.

2. A method of making a silica glass comprising aluminum, and at least one metal element selected from a group consisting of gadolinium, lanthanum and yttrium, wherein:

an alkoxide of aluminum hydrolyzed with water added thereto at a molar ratio of 20 to 200, and an acid is then added to a hydrolysate to prepare a boehmite sol, the boehmite sol is mixed with a salt of at least one metal element selected from the group consisting of gadolinium, lanthanum and yttrium or a solution in which said metal salt is dissolved to prepare a boehmite sol containing said metal salt, mixing the sol with a solution containing silicon alkoxide, and aging the obtained sol to form a gel, followed by drying and thermal treatment of said gel to make a silica glass.

3. A method of making a silica glass comprising aluminum, and at least one metal element selected from a group consisting of gadolinium, lanthanum and yttrium, wherein:

an alkoxide of aluminum is hydrolyzed with an aqueous solution in which a metal salt, at a molar ratio of 20 to 200, of at least one metal element selected from the group consisting of gadolinium, lanthanum and yttrium is dissolved, an acid is then added to a hydrolysate to prepare a boehmite sol containing said metal salt, mixing the sol with a solution containing silicon alkoxide, and aging the obtained sol to form a gel, followed by drying and thermal treatment of said gel to make a silica glass.

4. The glass-making method according to claim 2, which further comprises imparting to said metal element a concentration gradient increasing from a periphery to a center of a gel.

5. The glass-making method according to claim 4, wherein said at least one metal element comprises at least one first metal element and at least one second metal element, said at least one first metal element being selected from the group consisting of gadolinium, lanthanum and yttrium, and said second metal element being selected from the group consisting of titanium, niobium, tantalum and zirconium, said method further comprising a step of:

imparting to at least one metal element selected from a group consisting of titanium, niobium, tantalum and zirconium a concentration gradient that is uniform in said gel or decreases from a periphery to a center of said gel.

6. The glass-making method according to claim 3, which further comprises imparting to said metal element a concentration gradient increasing from a periphery to a center of a gel.

7. The glass-making method according to claim 6, wherein said at least one metal element comprises at least one first metal element and at least one second metal element, said at least one first metal element being selected from the group consisting of gadolinium, lanthanum and yttrium and said at least one second metal element being selected from the group consisting of titanium, niobium, tantalum and zirconium, said method further comprising a step of:

imparting to said at least one second metal element a concentration gradient that is uniform in said gel or decreases from a periphery to a center of said gel.

* * * * *